(12) United States Patent
Bush (10) Patent No.: US 10,919,556 B2
(45) Date of Patent: Feb. 16, 2021

(54) STACKABLE AND ROLLABLE CARTS AND PROCESSES FOR ASSEMBLING SAME

(71) Applicant: B&B Steel Products, Houston, TX (US)

(72) Inventor: Andrew Bush, Houston, TX (US)

(73) Assignee: B&B STEEL PRODUCTS, Houston, TX (US)

( * ) Notice: Subject to any disclaimer, the term of this patent is extended or adjusted under 35 U.S.C. 154(b) by 0 days.

(21) Appl. No.: 16/408,134

(22) Filed: May 9, 2019

(65) Prior Publication Data
US 2019/0344817 A1 Nov. 14, 2019

Related U.S. Application Data

(60) Provisional application No. 62/668,935, filed on May 9, 2018.

(51) Int. Cl.
| | |
|---|---|
| *B62B 3/16* | (2006.01) |
| *B62B 5/00* | (2006.01) |
| *B62B 3/10* | (2006.01) |
| *B62B 3/02* | (2006.01) |

(52) U.S. Cl.
CPC ............... *B62B 3/16* (2013.01); *B62B 3/022* (2013.01); *B62B 3/102* (2013.01); *B62B 5/00* (2013.01)

(58) Field of Classification Search
CPC ........... B62B 3/16; B62B 3/022; B62B 3/102
See application file for complete search history.

(56) References Cited

U.S. PATENT DOCUMENTS

| | | | | |
|---|---|---|---|---|
| 1,051,452 | A | | 1/1913 | Rock |
| 5,718,441 | A | * | 2/1998 | Kern ...................... A47B 57/14 |
| | | | | 211/187 |
| 6,050,740 | A | * | 4/2000 | Dziedzic .................. E02D 5/74 |
| | | | | 403/305 |
| 6,398,445 | B1 | * | 6/2002 | Matali Badia .......... F16B 7/105 |
| | | | | 403/109.6 |
| 9,156,319 | B1 | * | 10/2015 | Kennemer ............. B60D 1/145 |
| 9,797,194 | B2 | * | 10/2017 | Moss ........................ E06C 1/32 |
| 2006/0087092 | A1 | * | 4/2006 | Chubb .................... B62B 5/049 |
| | | | | 280/79.11 |
| 2006/0091096 | A1 | | 5/2006 | Velez et al. |
| 2006/0103094 | A1 | * | 5/2006 | Wiff ........................ B62B 3/004 |
| | | | | 280/79.11 |

(Continued)

OTHER PUBLICATIONS

Jackson Model 5050 Conduit Rack; Instruction Sheet and Parts List; Jackson Tool, Greenville, South Carolina.

*Primary Examiner* — Brian L Swenson
(74) *Attorney, Agent, or Firm* — Edmonds & Cmaidalka, P.C.

(57) ABSTRACT

Carts for transporting elongated materials and processes for making, assembling, and using same. In some examples, the carts can include a pivot assembly that pivotally connects an arm to a frame to allow the arm to move between a use position and a stored position. An arm receiver can be configured to selectively engage the first arm to selectively maintain the arm in the use position, and to selectively disengage the arm to allow the arm to be moved from the use position to the stored position. A locking pin assembly can be configured for automatic actuation to allow the arm to move from the stored position to the use position and to lock the arm in the use position without manual actuation.

14 Claims, 8 Drawing Sheets

(56) References Cited

U.S. PATENT DOCUMENTS

| | | | | |
|---|---|---|---|---|
| 2007/0262567 A1* | 11/2007 | Benson | ................... | E06C 1/39 |
| | | | | 280/656 |
| 2008/0217503 A1* | 9/2008 | Zhuang | ................... | B62B 3/02 |
| | | | | 248/558 |
| 2011/0127735 A1* | 6/2011 | Bernard | ................. | B62B 3/005 |
| | | | | 280/33.998 |
| 2012/0018966 A1* | 1/2012 | Moore | ................... | B62B 3/025 |
| | | | | 280/79.11 |
| 2018/0346009 A1* | 12/2018 | Mendoza | ............... | B62B 1/002 |

* cited by examiner

STACKABLE AND ROLLABLE CARTS AND PROCESSES FOR ASSEMBLING SAME

CROSS-REFERENCE TO RELATED APPLICATION

This application claims priority to U.S. Provisional Patent Application No. 62/668,935, filed on May 9, 2018, which is incorporated by reference herein.

BACKGROUND

Field

Embodiments described generally relate to carts for transporting elongated materials and processes for making, assembling, and using same.

Description of the Related Art

Carts for supporting and transporting material can be used by pipe-fitters, welders, and other fabricators. The carts can be used to store and organize materials prior to the materials being cut, welded, or otherwise used. In some instances the materials can be elongated such as pipes, tubing, rods, angle iron, channel iron, and other shaped stock material. Sometimes, more than one cart is needed to carry the materials, and at other times the carts are not being used and can take up needed floor space in a work area.

Conventional carts can have folding arms that are moved upright for use, and folded down when the cart is not in use. These conventional carts, however, are generally slow to assemble.

There is a need, therefore, for a more rapid way to secure the arms of a cart in the upright position.

SUMMARY

A cart for transporting elongated materials and processes for making, assembling, and using same are provided. In some examples, a cart for transporting elongated materials can include a frame and a plurality of wheels connected to the frame and configured to support the cart. A first arm and a second arm, can each include a first end and a second end. A first pivot assembly can pivotally connect the first end of the first arm to the frame to allow the first arm to move between a use position and a stored position. A second pivot assembly can pivotally connect the first end of the second arm to the frame to allow the second arm to move between the use position and the stored position. The first arm and the second arm can be substantially parallel to the frame when in the stored position, and the first pivot assembly and the second pivot assembly can include a first arm receiver and a second arm receiver, respectively. The first arm receiver and the second arm receiver can each be configured to selectively engage the first end of the first arm and the first end of the second arm, respectively, to selectively maintain the first arm and the second arm in the use position, and to selectively disengage the first end of the first arm and the first end of the second arm, respectively, to allow the first arm and the second arm to be moved from the use position to the stored position. The first pivot assembly and the second pivot assembly can include a first locking pin assembly and a second locking pin assembly, respectively. The first locking pin assembly and the second locking pin assembly can be configured to selectively lock the first end of the first arm and the first end of the second arm in the first arm receiver and the second arm receiver, respectively. The first locking pin assembly and the second locking pin assembly can be configured to selectively unlock the first end of the first arm and the first end of the second arm from the first arm receiver and the second arm receiver, respectively, to allow the first end of the first arm and the first end of the second arm to be removed from the first arm receiver and the second arm receiver, respectively. The first locking pin assembly and the second locking pin assembly can each be configured for manual actuation to unlock the first end of the first arm and the first end of the second arm from the first arm receiver and the second arm receiver, respectively, to allow the arm to move from the use position to the stored position, and for automatic actuation to allow the first arm and the second arm to move from the stored position to the use position and to lock the first arm and the second arm in the use position without manual actuation.

In some examples, a stackable cart for transporting elongated materials can include a frame and a plurality of wheels connected to the frame and configured to support the cart. The cart can include at least one arm including an arm end, the arm can include a locking pin hole adjacent to the arm end, and the cart can include a pivot assembly that can pivotally connects the arm to the frame to allow the arm to move between a use position and a stored position. At least one arm receiver can be configured for selectively engaging the arm end to position the arm in the use, position, in which the arm can be substantially perpendicular to the frame, and can be configured for selectively disengaging the arm end to allow the arm to pivot to the stored position in which the arm can be substantially parallel to the frame. The cart can include at least one locking pin assembly for selectively locking the arm in the use position. The locking pin assembly can include a bias spring, and a locking pin having a beveled end. The locking pin can be configured for movement between an extended position in which the beveled end is at least partially disposed in the arm receiver with the force of the bias spring, and a retracted position in which the beveled end is substantially retracted out of the arm receiver against the force of the bias spring. The locking pin can be engaged in the locking pin hole when the arm is in the use position to selectively lock the arm in the use position, and can be disengaged from the locking pin hole when the arm is not in the use position.

In some examples, a process for assembling a cart can include pivoting an arm of the cart from a stored position, in which the arm is substantially parallel to a frame of the cart, to a use position, in which the arm is substantially perpendicular to the frame. A first end of the arm can be moved into an arm receiver, and an end of a locking pin can be pushed out of the arm receiver by the first end of the arm when the first end of the arm is moved into the arm receiver. The end of the locking pin can return back into the arm receiver to lock the arm in the use position after the first end of the arm is moved into the arm receiver.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the system and processes for using same may be equally effective at various angles or orientations.

Figure 1:
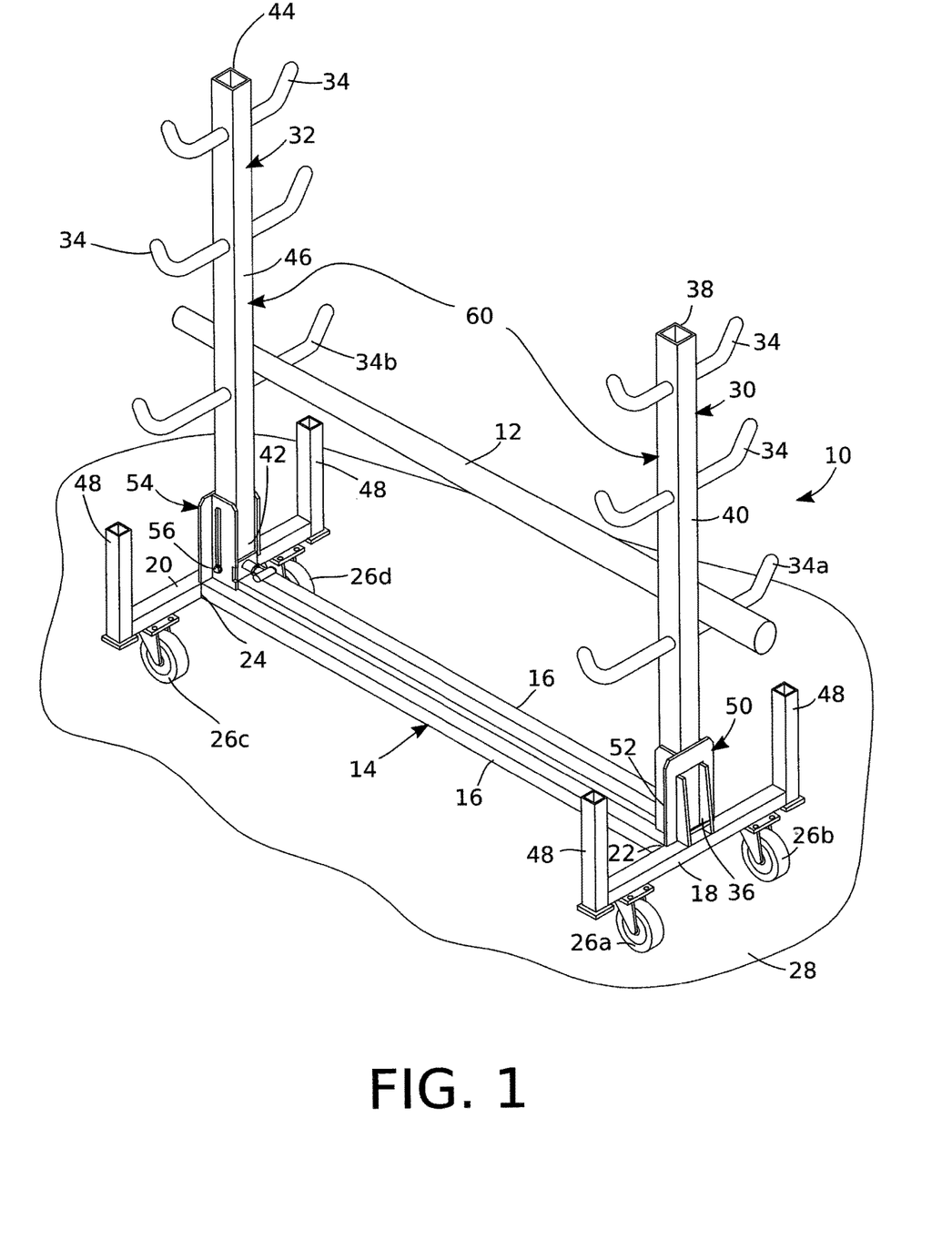
FIG. 1 depicts an illustrative cart for transporting elongated material, according to one or more embodiments described.

FIG. 1 depicts an illustrative cart 10 for transporting elongated material 12, according to one or more embodiments. The cart 10 can include a frame 14 that can provide or otherwise serve as a structural foundation for the cart 10. The frame 14 can include one or more frame rails 16, a first transverse member 18, and a second transverse member 20. The first transverse member 18 can be connected to a first end 22 of the frame rail 16 and can be arranged substantially perpendicular to the frame rail 16. The second transverse member 20 can be positioned at a second end 24 of the frame rails 16 and can be arranged substantially perpendicular to the frame rail 16.

The cart 10 can include a plurality of wheels 26 that can be connected to the frame 14 and can support the cart 10 to allow for movement of the cart 10, such as on a floor 28, by rolling on the wheels. In one example, the cart 10 can include a first wheel 26a, a second wheel 26b, a third wheel 26c, and a fourth wheel 26d. In other examples, the cart 10 can have three or more wheels 26, and the number of wheels can depend, at least in part, on a weight of a load that the cart 10 is anticipated to carry. In one example, the wheels 26 can be casters that can be rigid casters, swivel casters, or a combination of rigid and swivel casters.

The cart 10 can include a first arm 30 and a second arm 32. The first arm 30 can include a first end 36 and a second end 38 and can have an elongated body 40 extending between the first end 36 and the second end 38. The second arm 32 can include a first end 42 and a second end 44 and can have an elongated body 46 extending between the first end 42 and the second end 44. The arms 30 and 32 can each include one or more branches 34 that can extend from the elongated bodies 40 and 46 of the arms 30 and 32, respectively, for supporting the elongated material 12. In one example, each arm 30 and 32 can include six branches 34. In some examples, the branches 34 can include a shape that prevents or at least inhibits the material 12 from sliding off of the branches 34. In one example, the first arm 30 can include a branch 34a that partially supports the elongated material 12 and the second arm 32 can include a branch 34b that also partially supports the elongated material 12.

The cart 10 can include a first pivot assembly 50 that can include a pivot 52 that can pivotally connect the first end 36 of the first arm 30 to the frame 14. In some examples, the first pivot assembly 50 can be connected to the frame 14 at the first transverse member 18. The cart 10 can also include a second pivot assembly 54 that can include a pivot 56 that can pivotally connect the first end 42 of the second arm 32 to the frame 14. In some examples, the second pivot assembly 54 can be connected to the frame 14 at the second transverse member 20.

FIG. 1 depicts the cart 10 in a use position 60. In the use position 60, the first and second arms 30 and 32 or "arms 30/32" can extend generally upward and the branches 34 can be in a position to support the elongated material 12. In one example, in the use position 60, the arms 30/32 can be substantially perpendicular to the first and second transverse members 18 and 20 or "transverse members 18/20" and substantially perpendicular to the frame rail 16. In another example, in the use position 60, the arms 30/32 can be non-perpendicular to the transverse members 18/20 and/or non-perpendicular to the frame rail 16. In some examples, the arms 30 and 32 can have an elongated body 46 that extends a relatively short distance out of the first and/or second pivot assemblies 50 and 54 or "pivot assemblies 50/54" when in the use position 60 and one or both of the arms 30 and 32 can have one or more branches 34 that extend from the respective arm, such as in a "U" or other shape. In one example, a "U" shaped branch 34 can extend upward from the second ends 38 and 44 of the arms 30 and 32, respectively.

Figure 2:
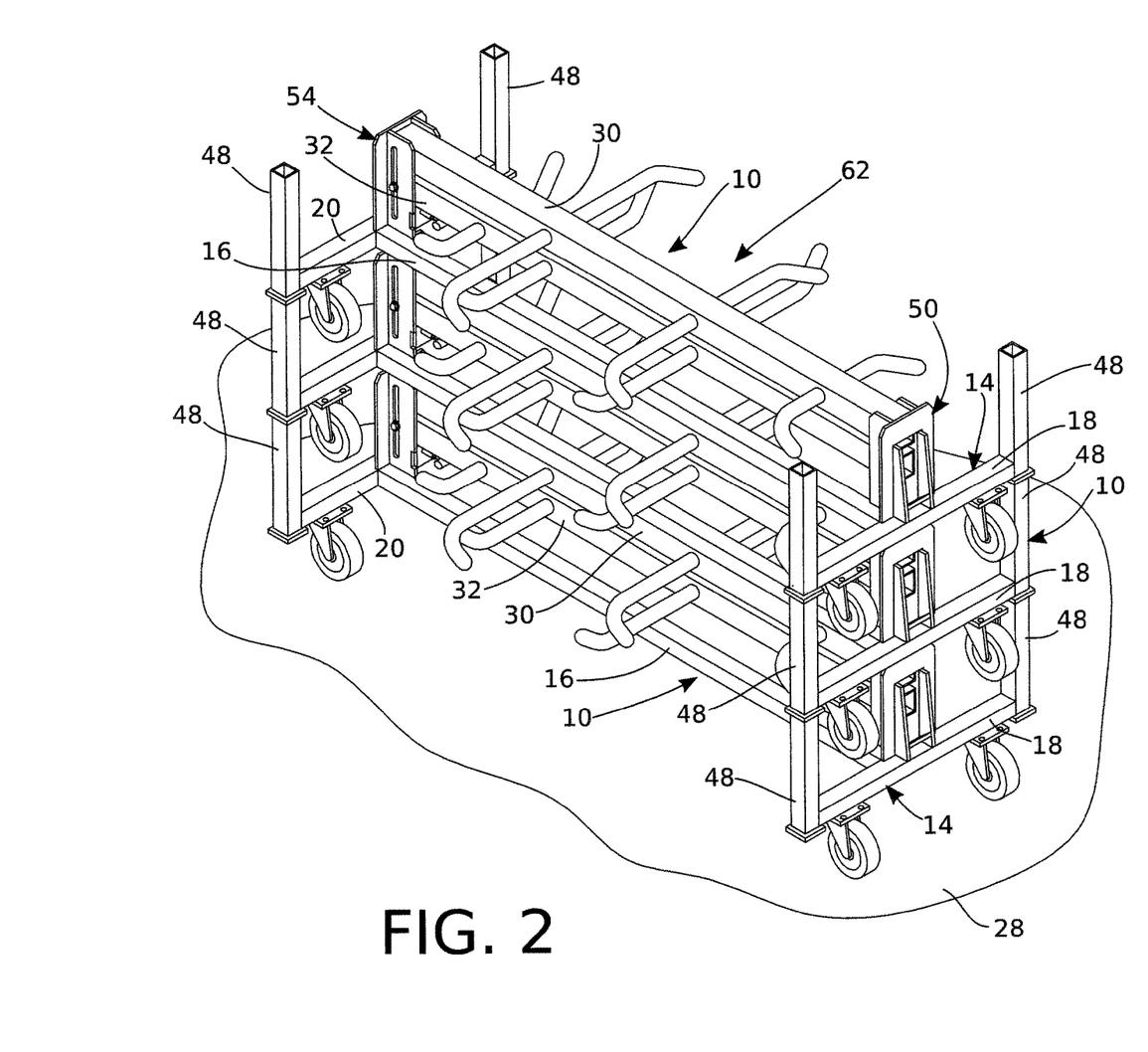
FIG. 2 depicts multiple illustrative carts with arms in a stored position, and with the carts stacked, according to one or more embodiments described.

FIG. 2 depicts multiple carts 10 with the arms 30 and 32 in a stored position 62, and with the carts 10 stacked, according to one or more embodiments. In some examples, when the arms 30/32 are in the stored position 60, the arms 30/32 can be folded down and can be substantially parallel to the frame rails 16 of the frame 14. The pivot assemblies 50/54 can allow the arms 30/32 to move, such as by pivotal motion, between the use position 60 (FIG. 1) and the stored position 62 (FIG. 2). In some examples, the frame 14 can include one or more frame risers 48 that can extend from the first and/or second transverse members 18/20. When the arms 30 and 32 are in the stored position 62, multiple carts 10 can be stacked by aligning the frame risers 48 of one cart 10 with the frame risers 48 of another cart 10 when the carts 10 are in the same orientation as one another. Positioning the arms 30 and 32 in the stored position 62 and stacking the carts 10 can minimize the space needed to store multiple carts 10 when not in use.

Figure 3:
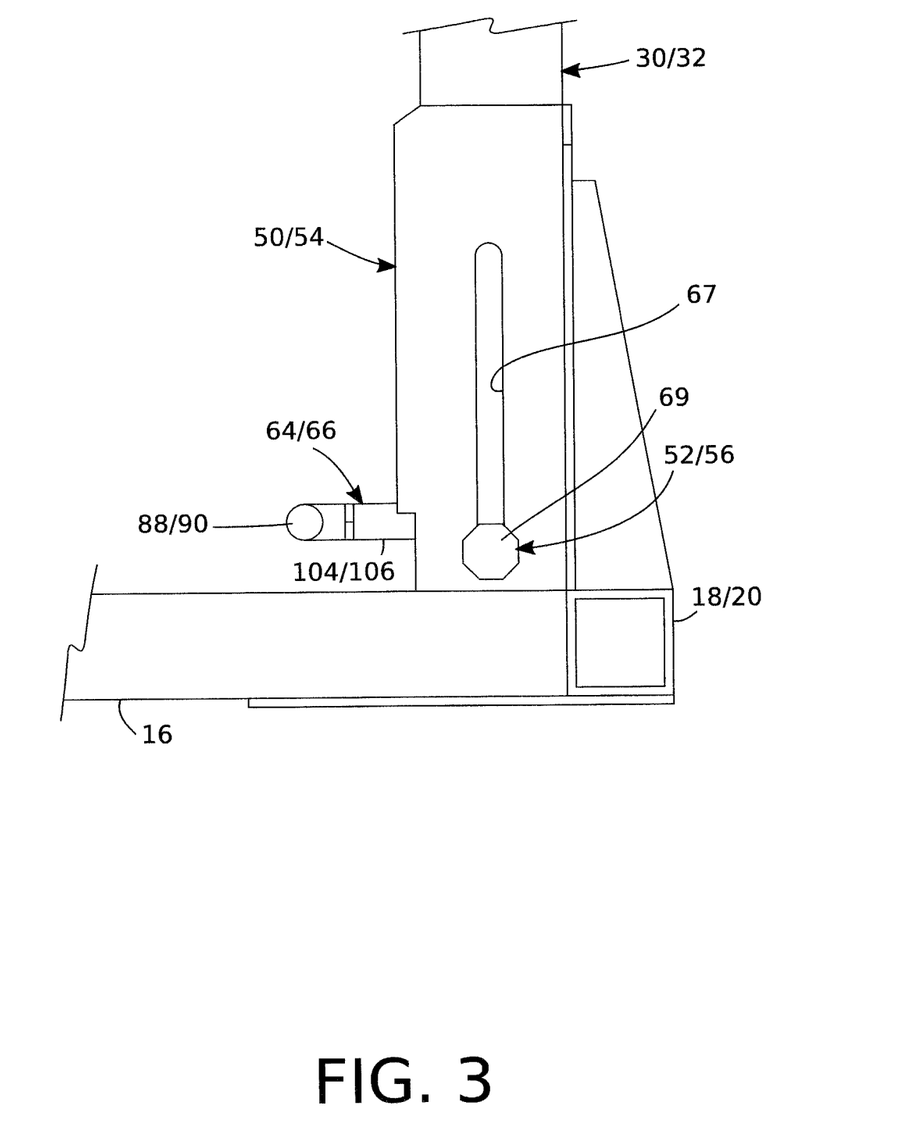
FIG. 3 depicts an enlarged view of pivot assemblies of the cart shown in FIG. 1 with wheels and portions of a frame removed, according to one or more embodiments described.

FIG. 3 depicts an enlarged view of the pivot assemblies 50/54 with the wheels 26 and portions of the frame 14 removed, according to one or more embodiments. In some examples, the pivot assembly 50 and the pivot assembly 54 can be substantially the same as one another and can be oriented in opposite directions with respect to one another when connected to the frame 14. The first and second pivot assemblies 50 and 54 can include first and second locking pin assemblies 64 and 66, or "locking pin assemblies 64/66," respectively, which can selectively lock the arms 30/32 in the use position 60, and selectively unlock the arms 30/32 to allow the arms 30/32 to move to the stored position 62.

The pivot assemblies 50/54 can include slots 67 in which the pivots 52/56 can slide or otherwise move. The pivot assemblies 50/54 can allow the arms 30/32 to rotate about the pivots 52/56 when the arms 30/32 are moved from the use position 60 to the stored position 62 and vice versa. The pivot assemblies 50/54 can allow the first arm 30 and the second arm 32 to stack with one on the other when the arms 30/32 are in the stored position 62 (see FIG. 2) by moving one of the pivots 52/56 a greater distance in the slot 67 than the other of the pivots 52/56. In this way both of the arms 30/32 can be substantially parallel to the frame rails 16 when the arms 30/32 are in the stored position 62.

Figure 4:
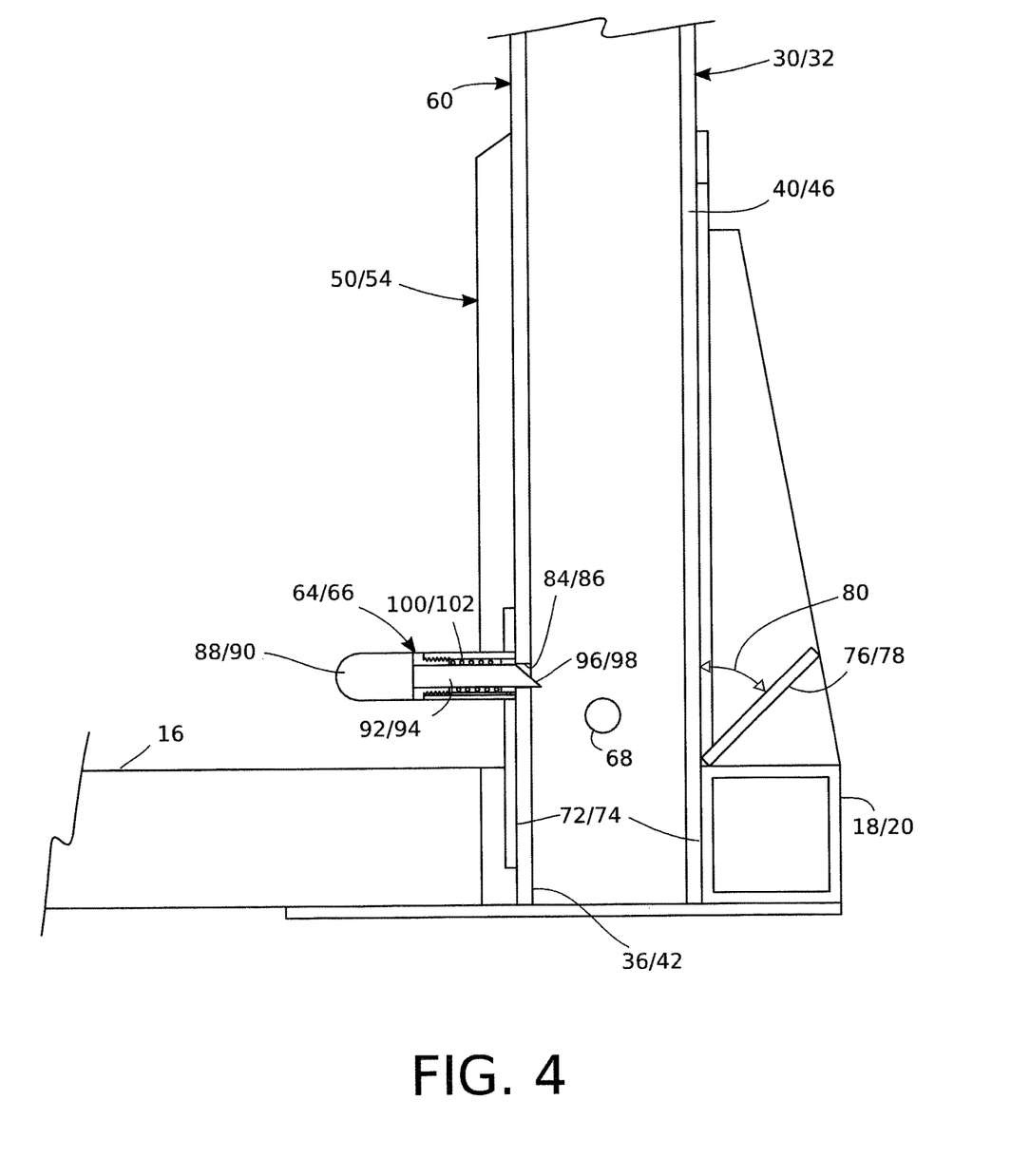
FIG. 4 depicts an enlarged cut away view of the pivot assemblies shown in FIG. 3, according to one or more embodiments described.

FIG. 4 depicts an enlarged cut away view of the pivot assemblies 50/54 shown in FIG. 3, according to one or more embodiments. The pivot assemblies 50/54 can include pivot shafts 69 (FIG. 3) which can extend through the slots 67 and through pivot arm holes 68 through the arms 30/32 (FIG. 4).

The cart 10 can include a first arm receiver 72 that can be part of the first pivot assembly 50. Similarly, the cart 10 can include a second arm receiver 74 that can be part of the second pivot assembly 54. The first and second arm receivers 72 and 74 or "arm receivers 72/74" can be configured for selectively engaging the first arm ends 36 and 42 of the first and second arms 30 and 32, respectively. For example, the arm receivers 72/74 can engage the first ends 36/42 to selectively maintain the arms 30/32, respectively, in the use position 60. In another example, the arm receivers 72/74 can selectively disengage the arm ends 36/42 to allow the arms 30/32 to be moved from the use position 60 to the stored position 62 (FIG. 2).

Figure 5:
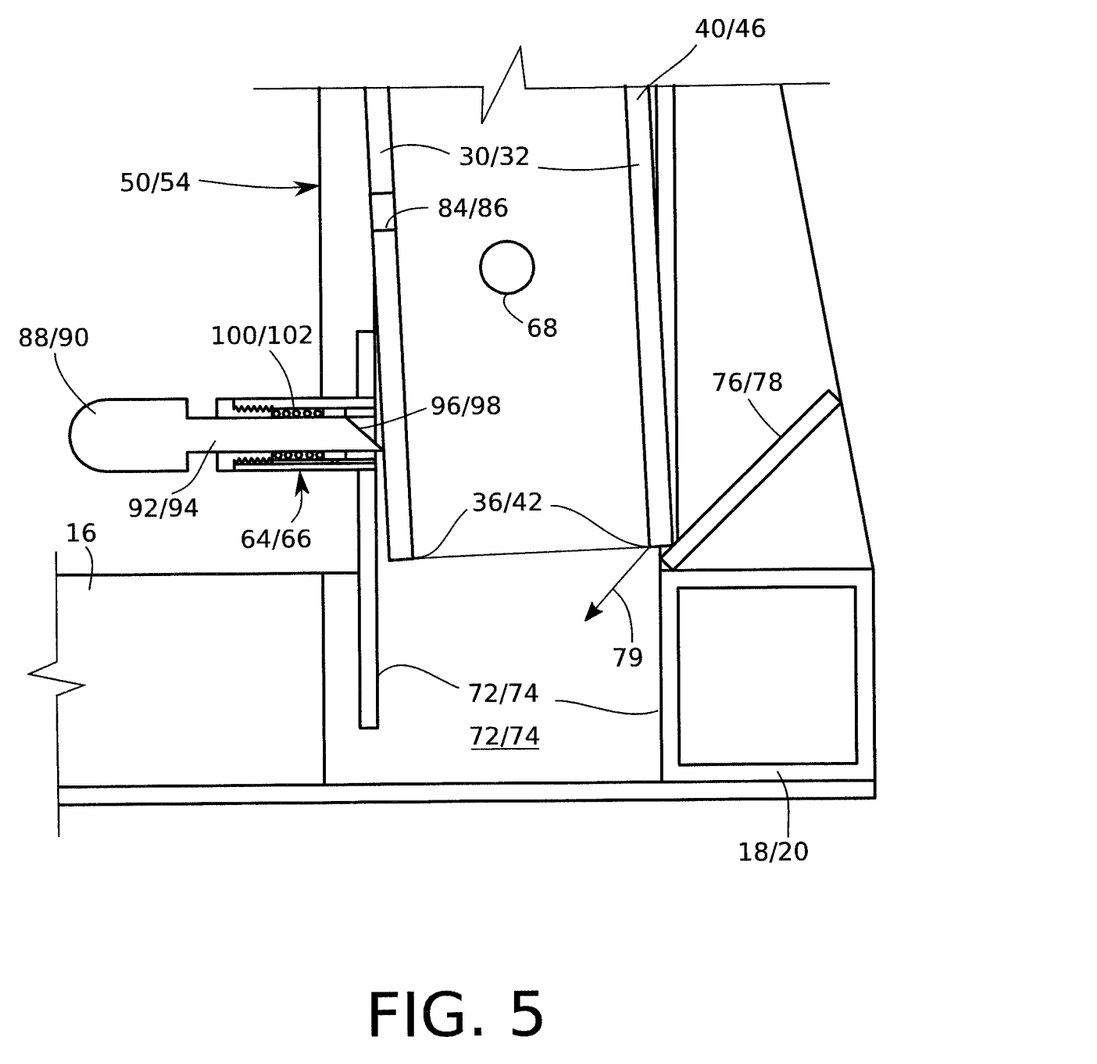
FIG. 5 depicts an enlarged cut away view of the pivot assemblies shown in FIG. 3, with arm ends being guided into arm receivers, according to one or more embodiments described.

FIG. 5 depicts an enlarged cut away view of the pivot assemblies 50/54 shown in FIG. 3, with the first ends 36/42 of the arms 30/32 being guided into the arm receivers 72/74, according to one or more embodiments. The pivot assemblies 50/54 can include first and second guide plates 76 and 78, or "guide plates 76/78," respectively, that can be configured or adapted to guide the first ends 36/42 of the arms 30/32 into the arm receivers 72/74 when the arms 30/32 pivot from the stored position 62 (FIG. 2) to the use position 60 (FIGS. 1 and 4). The guide plates 76/78 can be at an angle 80 (FIG. 4) of about 20°, about 25°, about 30°, about 35°, or about 40° to about 50°, about 60°, or about 70° relative to the respective elongated bodies 40/46 when the arms 30/32 are in the use position 60 as shown in FIGS. 1 and 4. For example, the guide plates 76/78 can be at an angle 80 (FIG. 4) of about 40°, about 45°, or about 50° relative to the respective elongated bodies 40/46 when the arms 30/32 are in the use position 60 as shown in FIGS. 1 and 4. The guide plates 76/78 can direct or otherwise urge the arm ends 36/42 in a direction shown by arrow 79 in FIG. 5 to move the first ends 36/42 of the arms 30/32 into the arm receivers 72/74.

In some examples, the arms 30/32 can have a substantially rectangular cross-sectional shape (not specifically shown) and the arm receivers 72/74 can define a box-like shape that is substantially complementary to the rectangular shape at the first ends 36/42 of the arms 30/32. The box-like shape of the arm receivers 72/74 can engage the first ends 36 and 42 or "first ends 36/42" of the arms 30/32 to maintain the arms 30/32 in the use position 60. In one example, the first and second pivot assemblies 50 and 54 can be connected to the first and second transverse members 18 and 20, respectively, of the frame 14, and the guide plates 76/78 can be arranged on an opposite side of the pivot assemblies 50/54 from the frame rail 16. The guide plates 76/78 can be configured to guide the first ends 36/42 of the arms 30/32 into the arm receivers 72/74 (FIG. 5) while the first ends 36/42 of the arms 30/32 are pulled by gravity toward the arm receivers 72/74. For example, when the cart 10 is situated with the wheels 26 on the floor 28 (or other surface) supporting the frame 14 (FIG. 1), and when the arms 30/32 are moving from the stored position 62 to the use position 60 (FIG. 5), the arms 30/32 can be substantially vertical and gravity can tend to force or otherwise urge the arms 30/32 downward toward the arm receivers 72/74. In this situation, the guide plates 76/78 can operate or otherwise serve as ramps that cooperate with gravity to guide the first ends 36/42 into alignment with the arm receivers 72/74.

Figure 6:
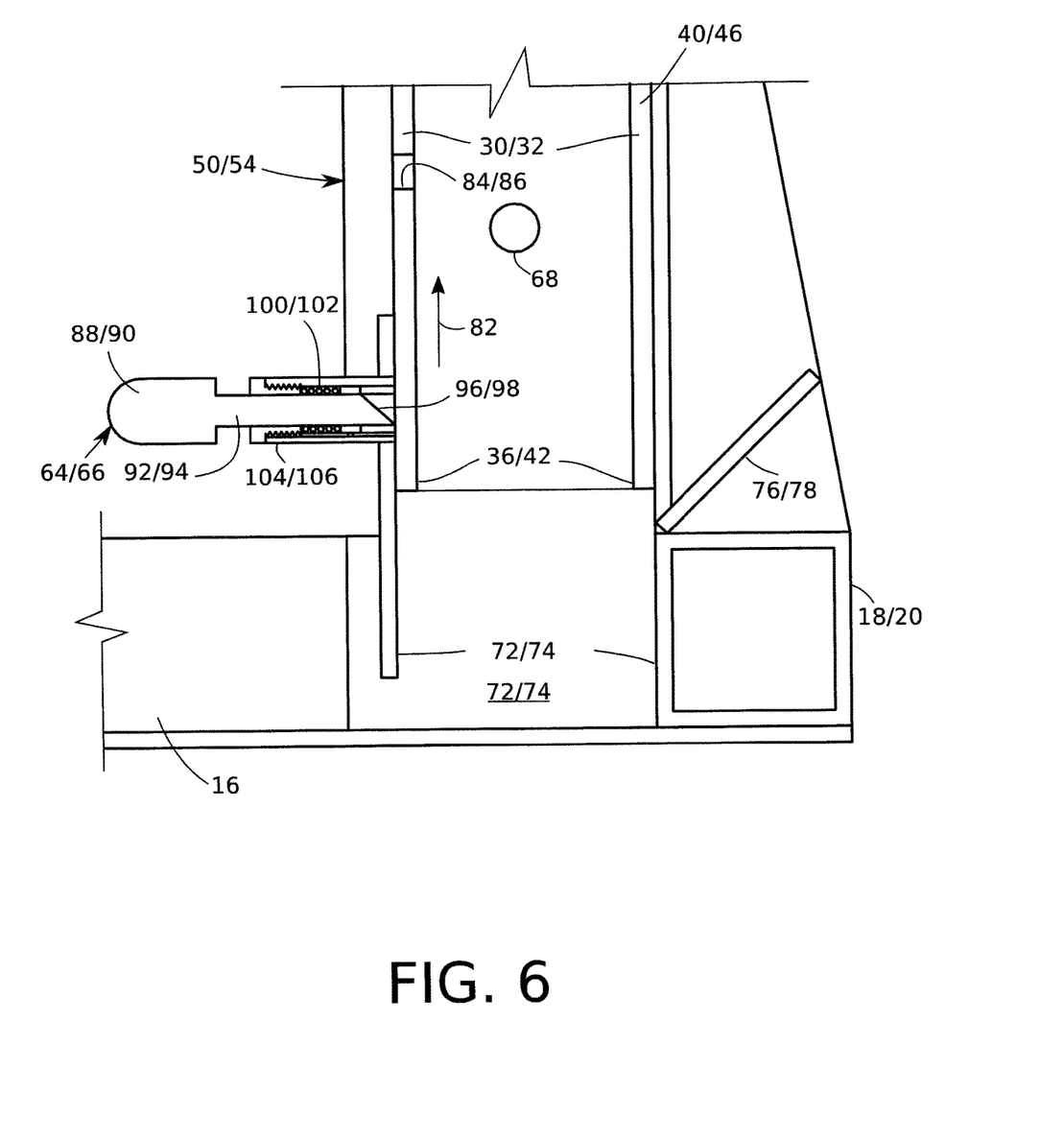
FIG. 6 depicts an enlarged cut away view of the pivot assemblies shown in FIG. 3, with the arm ends moving out of the arm receivers, according to one or more embodiments described.

FIG. 6 depicts an enlarged cut away view of the pivot assemblies 50/54 shown in FIG. 3, with the first ends 36/42 of the arms 30/32 moving out of the arm receivers 72/74, according to one or more embodiments. The first ends 36/42 of the arms 30/32 are shown moving in a direction of arrow 82. The first and second arms 30 and 32 can define locking pin holes 84 and 86 or "locking pin holes 84/86," respectively. In some examples, the first and second locking pin assemblies 64 and 66 can include first and second locking pin handles 88 and 90 or "locking pin handles 88/90," first and second locking pins 92 and 94 or "locking pins 92/94" that can have locking pin ends 96 and 98 or "locking pin ends 96/98", first and second bias springs 100 and 102 or "bias springs 100/102, and first and second ferrules 104 and 106 or "ferrules 104/106", respectively. The locking pin assemblies 64/66 can be configured or adapted to selectively lock or otherwise secure the first ends 36/42 in the arm receivers 72/74, as shown in FIGS. 3 and 4. The locking pin assemblies 64/66 can also be configured or adapted to selectively unlock or otherwise release the arm ends 36/42 so that the arm ends 36/42 can be removed from the arm receivers 72/74, as shown in FIG. 6.

In some examples, the locking pin assemblies 64/66 can be configured or adapted for manual actuation to unlock the first ends 36/42 to allow the arms 30/32 to move from the use position 60 to the stored position 62. For manual actuation, the locking pin handle 88/90 can be grasped by a user and pulled so that the locking pin 92/94 moves longitudinally in the ferrule 104/106, and the bias spring 100/102 is compressed. The movement of the locking pin 92/94 moves the locking pin end 96/98 out of the locking pin hole 84/86 of the respective arm 30/32 and the arm 30/32 is then free to move in the direction of arrow 82, out of the arm receiver 72/74 and from the use position 60 to the stored position 62. While not shown, in some examples, the locking pin handle 88/90 can include one or more elements configured or adapted to engage with a user's shoe or foot such that the locking pin handle 88/90 can be pulled without a user needing to bend or stoop down to grasp the locking pin handle 88/90 with his or her hand.

Figure 7:
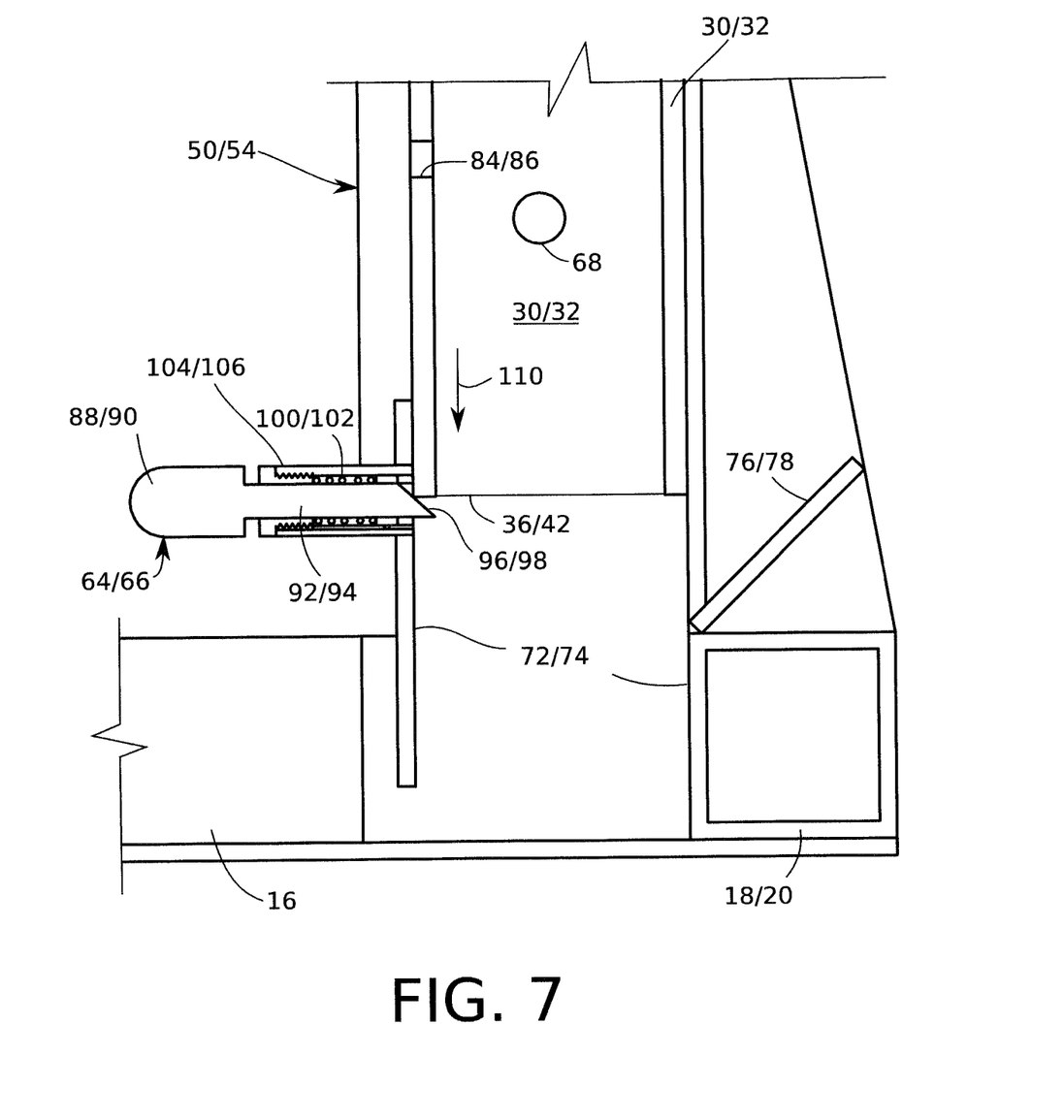
FIG. 7 depicts an enlarged cut away view of the pivot assemblies shown in FIG. 3, with the arm ends moving into the arm receivers, according to one or more embodiments described.

FIG. 7 depicts an enlarged cut away view of the pivot assemblies 50/54 shown in FIG. 3, with the arm ends 36/42 moving into the arm receivers 72/74, according to one or more embodiments. The locking pin assemblies 64/66 can be configured for automatic actuation to allow the arms 30/32 to move from the stored position 62 to the use position 60 and to lock the arms 30/32 in the use position 60 without manual actuation. The arm ends 36/42 are shown moving in a direction of arrow 110. In some examples, the locking pin ends 96/98 can include a bevel shape that can define a relatively shorter length of the locking pins 92/94 on a first or "top" side of the locking pins 92/94 and a relatively longer length of the locking pins 92/94 on a second or "bottom" side of the locking pins 92/94. When the first ends 36/42 of the arms 30/32 are moved from the stored position 62 to the use position 60, the first ends 36/42 can move in the direction of arrow 110. The beveled locking pin end 96/98 can contact and cooperate with the arm ends 36/42 to move the locking pins 92/94 out of the arm receivers 72/74 against the biases of the bias springs 100/102. When the locking pins 92/94 align with the locking pin holes 84/86 of the arms 30/32 then the bias springs 100/102 can force or otherwise urge the locking pin ends 96/98 in the locking pin holes 84/86 and lock the arms 30/32 in the use position 60 (FIG. 4).

Figure 8:
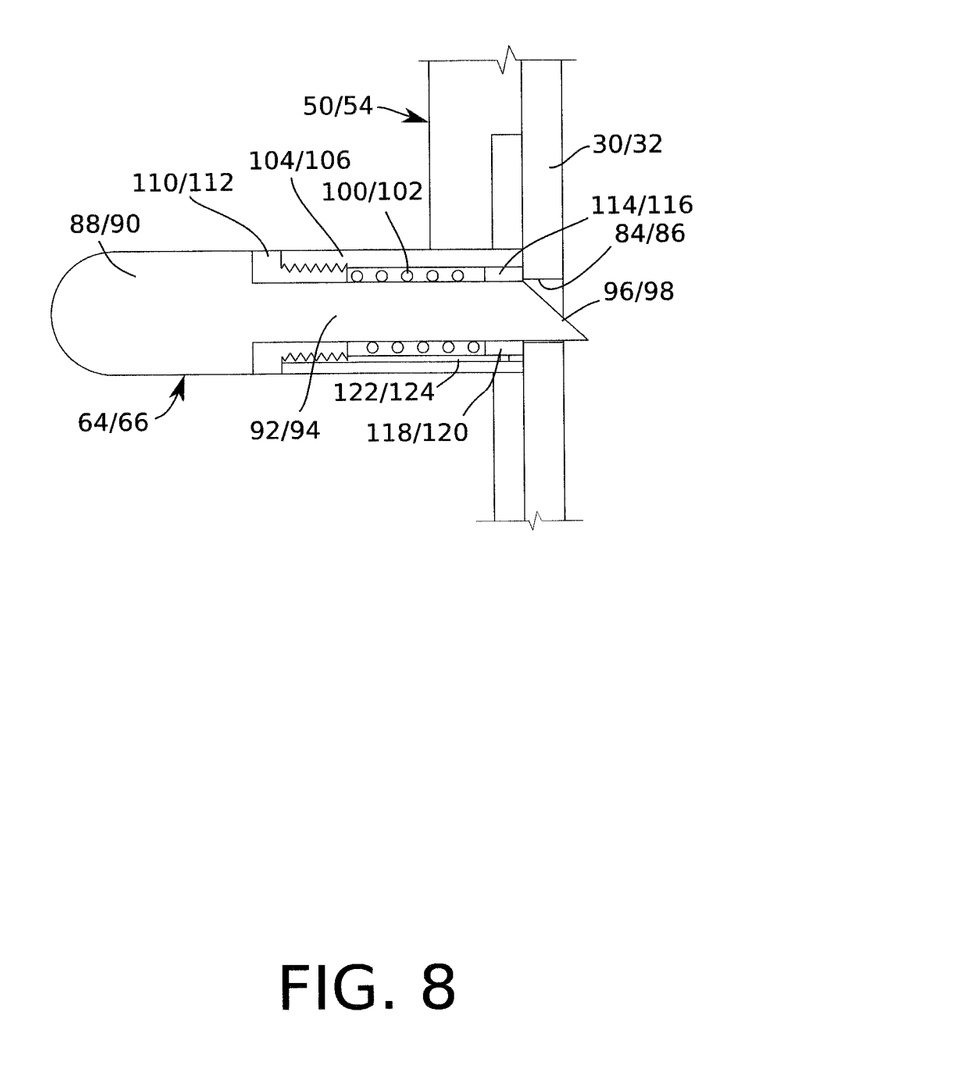
FIG. 8 depicts an enlarged cut away view of locking pin assemblies shown in FIG. 3, according to one or more embodiments described.

FIG. 8 depicts an enlarged cut away view of the locking pin assembly 64/66 shown in FIG. 3, according to one or more embodiments. The first and second locking pin assemblies 64 and 66 can include first and second sleeve nuts 110 and 112, (or "sleeve nuts 110/112"), first and second collars 114 and 116, (or "collars 114/116"), first and second guide pins 118 and 120, (or "guide pins 118/120"), and first and second slots 122 and 124, (or "slots 122/124"), respectively. The sleeve nuts 110/112 can thread into the ferrules 104/106 to hold the bias springs 100/102 from moving out of the ferrules 104/106 when the locking pins 92/94 move out of the arm receivers 72/74, such as when the locking pins 92/94 move out of the locking pin holes 84/86 of the arms 30/32, while allowing the locking pins 92/94 to slide longitudinally through the sleeve nuts 110/112. The collars 114/116 can be connected to the locking pins 92/94 and can move with the locking pins 92/94 to contact the bias springs 100/102 and to receive the bias spring force when the locking pins 92/94 are moved out of the arm receivers 72/74. The guide pins 118/120 can be connected to the collars 114/116 and can travel longitudinally along the slots 122/124 to maintain the orientation of the locking pins 92/94 with the beveled ends 96/98 facing to cooperate with the arm ends 36/42 during movement of the arms 30/32 from the stored position 62 to the use position 60.

In some examples, the locking pin ends 96/98 can include a curved shape that can define a rounded or spherical end. In some examples, the locking pin ends 96/98 can include a conical shape that can define a curved side that can end at one point. In some examples, the locking pin ends 96/98 can include a curved shape that can define a frustum end. In some examples, the locking pin ends 96/98 can include a plurality of planar sides that can define a pyramid. As such, the locking pin ends 96/98 can include the beveled end, a spherical end, a conical end, a frustoconical end, a pyramidal end, or any other desired three-dimensional shape. In some examples, the locking pin ends 96/98 can be a three-dimensional shape that is not a cylinder.

In some examples, the cart 10 can be made from steel, aluminum, or other metals, or metal alloys. In other examples, the cart 10 can be made from fiberglass or reinforced fiberglass. In other examples, the cart 10 can be made from plastic and/or a combination of plastic and other material. In some examples, the cart 10 can include one or more structural elements, such as gussets and/or plates, for increasing the rigidity and/or strength of the various components.

The cart 10 can provide a moveable support for transporting the elongated materials 12. The arms 30/32 can be moved from the stored position 62 to the use position 60 without the user having to manually manipulate any sort of locking device, e.g., manually pulling back a locking pin or having to insert and tighten a bolt or similar device. The locking pin assemblies 64/66 can automatically lock the arms 30/32 in the use position 60 which allows the user to use both hands to move the arms 30/32 from the stored position 62 to the use position 60, which can thereby make the use of the cart 10 more convenient than conventional carts. The guide plates 76/78 can at least partially guide the arms 30/32 into the arm receivers 72/74 to capture and to at least partially support the arms 30/32 in the use position 60. In some examples, the locking pin assemblies 64/66 can be permanently attached so that they remain with the cart 10 and cannot be lost.

It should be noted that the cart 10 is shown configured to hold elongated materials. An alternative configuration, however, can include, but is not limited to, a rack or cart for carrying one or more spools of wire, cable, tubing, fiber optic line, or other elongated members generally stored on spools. Another alternative configuration can include a cart configured to display one or more items for sale in a retail environment. In such example, the arms 30/32 can have different configurations that can be suitable for holding or otherwise supporting one or more items for display.

Embodiments of the present disclosure further relate to any one or more of the following paragraphs:

1. A cart for transporting elongated materials, comprising: a frame; a plurality of wheels connected to the frame and configured to support the cart; a first arm and a second arm, each including a first end and a second end; a first pivot assembly that pivotally connects the first end of the first arm to the frame to allow the first arm to move between a use position and a stored position; and a second pivot assembly that pivotally connects the first end of the second arm to the frame to allow the second arm to move between the use position and the stored position, wherein: the first arm and the second arm are substantially parallel to the frame when in the stored position, the first pivot assembly and the second pivot assembly include a first arm receiver and a second arm receiver, respectively, the first arm receiver and the second arm receiver are each configured to selectively engage the first end of the first arm and the first end of the second arm, respectively, to selectively maintain the first arm and the second arm in the use position, and to selectively disengage the first end of the first arm and the first end of the second arm, respectively, to allow the first arm and the second arm to be moved from the use position to the stored position, and wherein: the first pivot assembly and the second pivot assembly include a first locking pin assembly and a second locking pin assembly, respectively, and the first locking pin assembly and the second locking pin assembly are configured to selectively lock the first end of the first arm and the first end of the second arm in the first arm receiver and the second arm receiver, respectively, and are configured to selectively unlock the first end of the first arm and the first end of the second arm from the first arm receiver and the second arm receiver, respectively, to allow the first end of the first arm and the first end of the second arm to be removed from the first arm receiver and the second arm receiver, respectively, and wherein: the first locking pin assembly and the second locking pin assembly are each configured for manual actuation to unlock the first end of the first arm and the first end of the second arm from the first arm receiver and the second arm receiver, respectively, to allow the arm to move from the use position to the stored position, and for automatic actuation to allow the first arm and the second arm to move from the stored position to the use position and to lock the first arm and the second arm in the use position without manual actuation.

2. The cart according to paragraph 1, wherein the first pivot assembly includes a first guide plate and the second pivot assembly includes a second guide plate, and wherein the first guide plate and the second guide plate are each configured to guide the first end of the first arm and the first end of the second arm into the first arm receiver and the second arm receiver, respectively, when the first arm and the second arm are pivoted from the stored position to the use position, and wherein the first arm and the second arm each have an elongated body and the guide plates are arranged to be at an angle of about 20 degrees to about 50 degrees relative to the elongated body of the respective arm when the arm is in the use position.

3. The cart according to paragraph 2, wherein the first end of the first arm and the first end of the second arm each have a substantially rectangular cross-sectional shape and the first arm receiver and the second arm receiver each include a box shape that is complementary to the first end of the first arm and the first end of the second arm, and wherein the first arm receiver and the second arm receiver are each configured to engage the first end of the first arm and the first end of the second arm, respectively, to maintain the first arm and the second arm in the use position.

4. The cart according to paragraph 2, wherein the frame includes at least one frame rail and a first transverse member that is arranged substantially perpendicular to the frame rail on a first end of the frame rail, and a second transverse member that is arranged substantially perpendicular to the frame rail on a second end of the frame rail, and wherein the first pivot assembly is connected to the first transverse member and the second pivot assembly is connected to the second transverse member and the guide plates are arranged on an opposite side of the pivot assemblies from the frame rail.

5. The cart according to paragraph 2, wherein the first guide plate and the second guide plate are configured to guide the first end of the first arm and the first end of the second arm into the first arm receiver and second arm receiver, respectively, while the first end of the first arm and the first end of the second arm are pulled by gravity toward the first arm receiver and the second arm receiver, respectively.

6. The cart according to paragraph 2, wherein the first locking pin assembly and the second locking pin assembly include a first locking pin and a second locking pin, respectively, and wherein the first locking pin is on an opposite side of the first pivot assembly from the first guide plate, and the second locking pin is on an opposite side of the second pivot assembly from the second guide plate.

7. The cart according to any one of paragraphs 1 to 6, wherein: the first arm and second arm define a first locking pin hole and a second locking pin hole that are adjacent to the first end of the first arm and the first end of the second arm, respectively, the first locking pin assembly and the second locking pin assembly include a first locking pin and a second locking pin and a first bias spring and a second bias spring, respectively, the first and second locking pins extend at least partially into the respective arm receivers, and extend at least partially into the respective locking pin holes when the first and second arms are in the use position to selectively lock the first and second arms in the use position, the first and second bias springs bias the first and second locking pins into the first and second arm receivers, respectively, the first and second locking pins each include a beveled end that contact and cooperate with the first end of the first arm and the first end of the second arm, respectively, to move the first and second locking pins out of the first and second arm receivers against the biases of the first and second bias springs, respectively, while the first and second arms are moved from the stored position to the use position until the first and second locking pins align with the first and second locking pin holes and the first and second bias springs force the ends of the first and second locking pins into the first and second locking pin holes, respectively and lock the first and second arms in the use position.

8. The cart according to paragraph 7, wherein the first and second locking pin assemblies are configured such that manual actuation of the first and second locking pin assemblies to unlock the first end of the first arm and the first end of the second arm includes moving the respective beveled end of the first and second locking pins out of the first and second locking pin holes while compressing the first and second bias springs and while the first and second locking pin assemblies remain attached to the respective first and second arm receivers.

9. The cart according to paragraph 7, wherein the first and second locking pin assemblies are configured such that automatic actuation of the first and second locking pin assemblies to lock the first ends of the first and second arms includes the first ends of the first and second arms contacting the beveled ends of the first and second locking pins, respectively, and cooperating with the first ends to move the first and second locking pins out of the first and second arm receivers against the first and second spring biases while the first and second arms are moved from the stored position to the use position until the beveled ends of the first and second locking pins enter the first and second locking pin holes and lock the first and second arms in the use position.

10. The cart according to any one of paragraphs as described in paragraph 7 to 9, wherein the first and second locking pin assemblies are configured to maintain the beveled ends of the first and second locking pins in a direction that contacts the first ends of the first and second arms when the first and second arms are moved from the stored position to the use position.

11. The cart according to paragraphs 10, wherein the first and second locking pin assemblies include first and second guide pins and first and second slots, respectively, and wherein the first guide pin and first slot, and the second guide pin and the second slot, cooperate to maintain the respective beveled ends in a direction such that the beveled ends contact the first ends of the first and second arms when the first and second arms are moved from the stored position to the use position.

12. The cart according to any one of paragraphs 7 to 11, wherein the first and second locking pins are arranged facing away from one another, and wherein the first and second locking pins remain facing away from one another when the first and second arms are in the use position and when the first and second arms are in the stored position.

13. The cart according to any one of paragraphs 1 to 12, wherein the first arm and the second arm each include at least one branch that is configured to at least partially support the elongated materials.

14. The cart according to any one of paragraphs 1 to 13, wherein the frame includes frame risers and the frame risers from one cart can be stacked on the frame risers from another cart when the first and second arms of the carts are in the stored position and when the carts are in the same orientation with one another.

15. The cart according to any one of paragraphs 1 to 14, wherein the first arm and the second arm are substantially perpendicular to the frame when in the use position.

16. A stackable cart for transporting elongated materials, comprising: a frame; a plurality of wheels connected to the frame and configured to support the cart; at least one arm including an arm end, the arm including a locking pin hole adjacent to the arm end; a pivot assembly that pivotally connects the arm to the frame to allow the arm to move between a use position and a stored position; at least one arm receiver that is configured for selectively engaging the arm end to position the arm in the use position, in which the arm is substantially perpendicular to the frame, and for selectively disengaging the arm end to allow the arm to pivot to the stored position in which the arm is substantially parallel to the frame; at least one locking pin assembly for selectively locking the arm in the use position, the locking pin assembly including a bias spring, and a locking pin having a beveled end, the locking pin configured for movement between an extended position in which the beveled end is at least partially disposed in the arm receiver with the force of the bias spring, and a retracted position in which the beveled end is substantially retracted out of the arm receiver against the force of the bias spring, and wherein the locking pin is engaged in the locking pin hole when the arm is in the use position to selectively lock the arm in the use position, and is disengaged from the locking pin hole when the arm is not in the use position.

17. The cart according to paragraph 16, wherein the locking pin assembly is configured for automatic actuation such that the locking pin moves from the extended position to the retracted position and back to the extended position, without manual actuation of the locking pin, to lock the arm in the use position when the arm is moved from the stored position to the use position.

18. The cart according to paragraph 16, wherein locking pin assembly is configured for manual actuation of the locking pin to unlock the arm from the use position to allow the arm to be moved from the use position to the stored position.

19. The cart according to any one of paragraphs 16 to 18, the cart further comprising: a guide plate which is arranged to guide the arm end into the arm receiver when the arm is moved from the stored position to the use position.

20. The cart according to any one of paragraphs 16 to 19, wherein the frame includes at least one frame rail and wherein the locking pin assembly is arranged such that movement of the locking pin is substantially parallel to the frame rail.

21. A process for assembling a cart, comprising: pivoting an arm of the cart from a stored position, in which the arm is substantially parallel to a frame of the cart, to a use position, in which the arm is substantially perpendicular to the frame; and moving a first end of the arm into an arm receiver, wherein an end of a locking pin is pushed out of the arm receiver by the first end of the arm when the first end of the arm is moved into the arm receiver, and wherein the end of the locking pin returns back into the arm receiver to lock the arm in the use position after the first end of the arm is moved into the arm receiver.

22. The process according to paragraph 21, wherein the end of the locking pin comprises a beveled surface.

23. The process according to paragraph 21 or 22, wherein the first end of the arm contacts a guide plate when the first end of the arm is moved into the arm receiver, and wherein the guide plate directs the first end into the arm receiver.

24. The process according to paragraph 23, wherein the guide plate and the locking pin are disposed on opposite sides of the arm receiver.

25. A stackable cart for transporting elongated materials, comprising: a frame; a plurality of wheels connected to the transverse members and configured to support the cart; a first arm and a second arm, the first arm and the second arm each including at least one branch that is configured to at least partially support the elongated materials, the first arm having a first arm end that is pivotally connected to the frame, and the second arm a second arm end that is pivotally connected to the frame, the pivotal connections allowing first and second arms to each move between a use position and a stored position, and wherein the first and second arms each including a locking pin hole adjacent to the respective arm ends; first and second arm receivers that are configured for selectively engaging the arm ends of the first and second arms, respectively, to position the first and second arms in the use position in which the arm is substantially perpendicular to the frame, and for selectively disengaging the arm ends of the first and second arms to allow the first and second arms to pivot to the stored position in which the first and second arms are substantially parallel to the frame rail; first and second guide plates which are configured to guide the arm ends of the first and second arms into the first and second arm receivers, respectively, when the first and second arms are moved from the stored position to the use position; and first and second locking pin assemblies for selectively locking the first and second arms, respectively, in the use position, the first and second locking pin assemblies including first and second bias springs, and first and second locking pins having beveled ends, respectively, the first and second locking pins are configured for movement between an extended position in which the respective beveled end is at least partially disposed in the respective arm receiver with the force of the respective bias spring, and a retracted position in which the respective beveled end is substantially retracted out of the respective arm receiver against the force of the respective bias spring, and wherein the first and second locking pins engage in the first and second arm locking pin holes, respectively, when the first and second arms are in the use position to selectively lock the first and second arms in the use position, and disengage from the arm locking pin holes when the first and second arms are not in the use position.

26. A cart for transporting elongated materials, comprising: a frame; a first arm and a second arm, each including a first end and a second end; a first pivot assembly that pivotally connects the first end of the first arm to the frame to allow the first arm to move between a use position and a stored position; and a second pivot assembly that pivotally connects the first end of the second arm to the frame to allow the second arm to move between the use position and the stored position, wherein: the first pivot assembly and the second pivot assembly include a first locking pin assembly and a second locking pin assembly, respectively, and the first locking pin assembly and the second locking pin assembly are configured to selectively lock the first end of the first arm and the first end of the second arm in the use position, respectively, and are configured to selectively unlock the first end of the first arm and the first end of the second arm, respectively, to allow the first end of the first arm and the first end of the second arm to be moved from the use position to the stored position respectively, and the first locking pin assembly and the second locking pin assembly are each configured for manual actuation to unlock the first end of the first arm and the first end of the second arm, respectively, to allow the first arm and the second arm to move from the use position to the stored position, and the first locking pin assembly and the second locking pin assembly are each configured for automatic actuation to lock the first end of the first arm and the first end of the second arm, respectively, in the use position without manual actuation when the first arm and the second arm are moved from the stored position to the use position.

27. The cart according to paragraph 26, further comprising a plurality of wheels connected to the frame and configured to support the cart.

28. The cart according to paragraph 26 or 27, wherein the first arm and the second arm are substantially parallel to the frame when in the stored position.

29. The cart according to any one of paragraphs 26 to 28, wherein the first arm and the second arm are substantially perpendicular to the frame when in the use position.

30. The cart according to any one of paragraphs 26 to 28, wherein the first arm and the second arm are non-perpendicular to the frame when in the use position.

31. The cart according to any one of paragraphs 26 to 30, wherein the first pivot assembly includes a first guide plate and the second pivot assembly includes a second guide plate.

32. The cart according to paragraph 31, wherein the first guide plate and the second guide plate are each configured to guide the first end of the first arm and the first end of the second arm into the first arm receiver and the second arm receiver, respectively, when the first arm and the second arm are moved from the stored position to the use position.

33. The cart according to paragraph 32, wherein the first arm and the second arm each have an elongated body and the guide plates are arranged to be at an angle of about 20 degrees to about 50 degrees relative to the elongated body of the respective arm when the arm is in the use position.

34. The cart according to any one of paragraphs 31 to 33, wherein the first locking pin assembly and the second locking pin assembly include a first locking pin and a second locking pin, respectively, and wherein the first locking pin is on an opposite side of the first pivot assembly from the first guide plate, and the second locking pin is on an opposite side of the second pivot assembly from the second guide plate.

35. The cart according to any one of paragraphs 26 to 34, wherein the first arm and second arm define a first locking pin hole and a second locking pin hole that are adjacent to the first end of the first arm and the first end of the second arm, respectively, the first locking pin assembly and the second locking pin assembly include a first locking pin and a second locking pin and a first bias spring and a second bias spring, respectively, the first and second locking pins extend at least partially into the respective arm receivers, and extend at least partially into the respective locking pin holes when the first and second arms are in the use position to selectively lock the first and second arms in the use position, the first and second bias springs bias the first and second locking pins into the first and second arm receivers, respectively, the first and second locking pins each include a beveled end that contact and cooperate with the first end of the first arm and the first end of the second arm, respectively, to move the first and second locking pins out of the first and second arm receivers against the biases of the first and second bias springs, respectively, while the first and second arms are moved from the stored position to the use position until the first and second locking pins align with the first and second locking pin holes and the first and second bias springs force the ends of the first and second locking pins into the first and second locking pin holes, respectively and lock the first and second arms in the use position.

Although the preceding description has been described herein with reference to particular means, materials, and embodiments, it is not intended to be limited to the particulars disclosed herein; rather, it extends to all functionally equivalent structures, processes, and uses, such as are within the scope of the appended claims.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A cart for transporting elongated materials, comprising:
a frame;
a plurality of wheels connected to the frame and configured to support the cart;
a first arm and a second arm, each including a first end and a second end;
a first pivot assembly that pivotally connects the first end of the first arm to the frame to allow the first arm to move between a use position and a stored position; and
a second pivot assembly that pivotally connects the first end of the second arm to the frame to allow the second arm to move between the use position and the stored position, wherein:
the first arm and the second arm are substantially parallel to the frame when in the stored position,
the first pivot assembly and the second pivot assembly include a first arm receiver and a second arm receiver, respectively,
the first arm receiver and the second arm receiver are each configured to selectively engage the first end of the first arm and the first end of the second arm, respectively, to selectively maintain the first arm and the second arm in the use position, and to selectively disengage the first end of the first arm and the first end of the second arm, respectively, to allow the first arm and the second arm to be moved from the use position to the stored position, and wherein:
the first pivot assembly and the second pivot assembly include a first locking pin assembly and a second locking pin assembly, respectively, and the first locking pin assembly and the second locking pin assembly are configured to selectively lock the first end of the first arm and the first end of the second arm in the first arm receiver and the second arm receiver, respectively, and are configured to selectively unlock the first end of the first arm and the first end of the second arm from the first arm receiver and the second arm receiver, respectively, to allow the first end of the first arm and the first end of the second arm to be removed from the first arm receiver and the second arm receiver, respectively, and wherein:
the first locking pin assembly and the second locking pin assembly are each configured for manual actuation to unlock the first end of the first arm and the first end of the second arm from the first arm receiver and the second arm receiver, respectively, to allow the arm to move from the use position to the stored position, and for automatic actuation to allow the first arm and the second arm to move from the stored position to the use position and to lock the first arm and the second arm in the use position without manual actuation,
wherein the first pivot assembly includes a first guide plate and the second pivot assembly includes a second guide plate, and wherein the first guide plate and the second guide plate are each configured to guide the first end of the first arm and the first end of the second arm into the first arm receiver and the second arm receiver, respectively, when the first arm and the second arm are pivoted from the stored position to the use position, and wherein the first arm and the second arm each have an elongated body and the guide plates are arranged to be at an angle of about 20 degrees to about 50 degrees relative to the elongated body of the respective arm when the arm is in the use position.

2. The cart of claim 1, wherein the first end of the first arm and the first end of the second arm each have a substantially rectangular cross-sectional shape and the first arm receiver and the second arm receiver each include a box shape that is complementary to the first end of the first arm and the first end of the second arm, and wherein the first arm receiver and the second arm receiver are each configured to engage the first end of the first arm and the first end of the second arm, respectively, to maintain the first arm and the second arm in the use position.

3. The cart of claim 1, wherein the frame includes at least one frame rail and a first transverse member that is arranged substantially perpendicular to the frame rail on a first end of the frame rail, and a second transverse member that is arranged substantially perpendicular to the frame rail on a second end of the frame rail, and wherein the first pivot assembly is connected to the first transverse member and the second pivot assembly is connected to the second transverse member and the guide plates are arranged on an opposite side of the pivot assemblies from the frame rail.

4. The cart of claim 1, wherein the first guide plate and the second guide plate are configured to guide the first end of the first arm and the first end of the second arm into the first arm receiver and second arm receiver, respectively, while the first end of the first arm and the first end of the second arm are pulled by gravity toward the first arm receiver and the second arm receiver, respectively.

5. The cart of claim 1, wherein the first locking pin assembly and the second locking pin assembly include a first locking pin and a second locking pin, respectively, and wherein the first locking pin is on an opposite side of the first pivot assembly from the first guide plate, and the second locking pin is on an opposite side of the second pivot assembly from the second guide plate.

6. The cart of claim 1, wherein:
the first arm and second arm define a first locking pin hole and a second locking pin hole that are adjacent to the first end of the first arm and the first end of the second arm, respectively,
the first locking pin assembly and the second locking pin assembly include a first locking pin and a second locking pin and a first bias spring and a second bias spring, respectively,
the first and second locking pins extend at least partially into the respective arm receivers, and extend at least partially into the respective locking pin holes when the first and second arms are in the use position to selectively lock the first and second arms in the use position,
the first and second bias springs bias the first and second locking pins into the first and second arm receivers, respectively,
the first and second locking pins each include a beveled end that contact and cooperate with the first end of the first arm and the first end of the second arm, respectively, to move the first and second locking pins out of the first and second arm receivers against the biases of the first and second bias springs, respectively, while the first and second arms are moved from the stored position to the use position until the first and second locking pins align with the first and second locking pin holes and the first and second bias springs force the ends of the first and second locking pins into the first and second locking pin holes, respectively, and lock the first and second arms in the use position.

7. The cart of claim 6, wherein the first and second locking pin assemblies are configured such that manual actuation of the first and second locking pin assemblies to unlock the first end of the first arm and the first end of the second arm includes moving the respective beveled end of the first and second locking pins out of the first and second locking pin holes while compressing the first and second bias springs and while the first and second locking pin assemblies remain attached to the respective first and second arm receivers.

8. The cart of claim 6, wherein the first and second locking pin assemblies are configured such that automatic actuation of the first and second locking pin assemblies to lock the first ends of the first and second arms includes the first ends of the first and second arms contacting the beveled ends of the first and second locking pins, respectively, and cooperating with the first ends to move the first and second locking pins out of the first and second arm receivers against the first and second spring biases while the first and second arms are moved from the stored position to the use position until the beveled ends of the first and second locking pins enter the first and second locking pin holes and lock the first and second arms in the use position.

9. The cart of claim 6, wherein the first and second locking pin assemblies are configured to maintain the beveled ends of the first and second locking pins in a direction that contacts the first ends of the first and second arms when the first and second arms are moved from the stored position to the use position.

10. The cart of claim 9, wherein the first and second locking pin assemblies include first and second guide pins and first and second slots, respectively, and wherein the first guide pin and first slot, and the second guide pin and the second slot, cooperate to maintain the respective beveled ends in a direction such that the beveled ends contact the first ends of the first and second arms when the first and second arms are moved from the stored position to the use position.

11. The cart of claim 6, wherein the first and second locking pins are arranged facing away from one another, and wherein the first and second locking pins remain facing away from one another when the first and second arms are in the use position and when the first and second arms are in the stored position.

12. The cart of claim 1, wherein the frame includes frame risers and the frame risers from one cart can be stacked on the frame risers from another cart when the first and second arms of the carts are in the stored position and when the carts are in the same orientation with one another.

13. A process for assembling a cart, comprising:
pivoting an arm of the cart from a stored position, in which the arm is substantially parallel to a frame of the cart, to a use position, in which the arm is substantially perpendicular to the frame; and
moving a first end of the arm into an arm receiver, wherein an end of a locking pin is pushed out of the arm receiver by the first end of the arm when the first end of the arm is moved into the arm receiver, and wherein the end of the locking pin returns back into the arm receiver to lock the arm in the use position after the first end of the arm is moved into the arm receiver,
wherein the first end of the arm contacts a guide plate when the first end of the arm is moved into the arm receiver, and the guide plate directs the first end into the arm receiver; and
wherein the guide plate and the locking pin are disposed on opposite sides of the arm receiver.

14. The process of claim 13, wherein the end of the locking pin comprises a beveled surface.

* * * * *